United States Patent [19]

Richard et al.

[11] Patent Number: 5,611,399
[45] Date of Patent: Mar. 18, 1997

[54] SCREEN AND METHOD OF MANUFACTURING

[75] Inventors: Bennett M. Richard, Kingwood; Elmer R. Peterson, The Woodlands, both of Tex.; Brian J. Horton, St. Martinville, La.

[73] Assignee: Baker Hughes Incorporated, Houston, Tex.

[21] Appl. No.: 555,945

[22] Filed: Nov. 13, 1995

[51] Int. Cl.⁶ ............................................. E21B 43/08
[52] U.S. Cl. .................. 166/230; 29/896.62; 166/233; 210/497.1; 210/499
[58] Field of Search ............................ 166/230, 231, 166/232, 233, 234, 236; 210/315, 489, 497.1, 499; 29/896.61, 896.62

[56] References Cited

U.S. PATENT DOCUMENTS

| | | | |
|---|---|---|---|
| 1,229,437 | 6/1917 | Foster | 166/230 U X |
| 2,310,507 | 2/1943 | Bodey, Jr. | 29/896.61 X |
| 2,327,687 | 8/1943 | Williams et al. | 29/896.61 X |
| 2,838,120 | 6/1958 | Allmendinger et al. | 166/230 X |
| 3,816,894 | 6/1974 | Howard et al. | 29/896.62 |
| 3,996,640 | 12/1976 | Blue et al. | 210/380.1 X |
| 4,443,233 | 4/1984 | Moran. | |
| 4,767,426 | 8/1988 | Daly et al. | 210/497.01 X |
| 4,801,379 | 1/1989 | Ehrsam et al. | 210/500.25 X |
| 5,200,072 | 4/1993 | Frejborg et al. | 210/232 |
| 5,223,136 | 6/1993 | Gilbert | 210/315 |
| 5,259,512 | 11/1993 | Czerwoniak | 210/415 X |
| 5,318,119 | 6/1994 | Lowry et al. | 166/233 X |
| 5,417,859 | 5/1995 | Bakula | 210/499 X |

*Primary Examiner*—George A. Suchfield
*Attorney, Agent, or Firm*—Rosenblatt & Redano, P.C.

[57] ABSTRACT

A sand-filtering screen-making technique and screen are disclosed, which involves an initial assembly of the sand-filtering screen over an underlying coarse screen. The sand-filtering screen has a mechanical, longitudinal overlap-type joint. End caps are fitted over the filtering screen which has already been preassembled to the underlying coarse screen. The assembly is then mechanically forced through a die to compress the end caps onto the assembled filtering screen and underlying coarse screen. That subassembly is then assembled onto a base pipe and secured. An outer shroud can then be secured to the underlying base pipe, overlaying the filtering screen. The ends of the subassembly comprising the filtering screen and the underlying coarse screen are sealed against the support pipe by a packing gland arrangement at both ends.

28 Claims, 7 Drawing Sheets

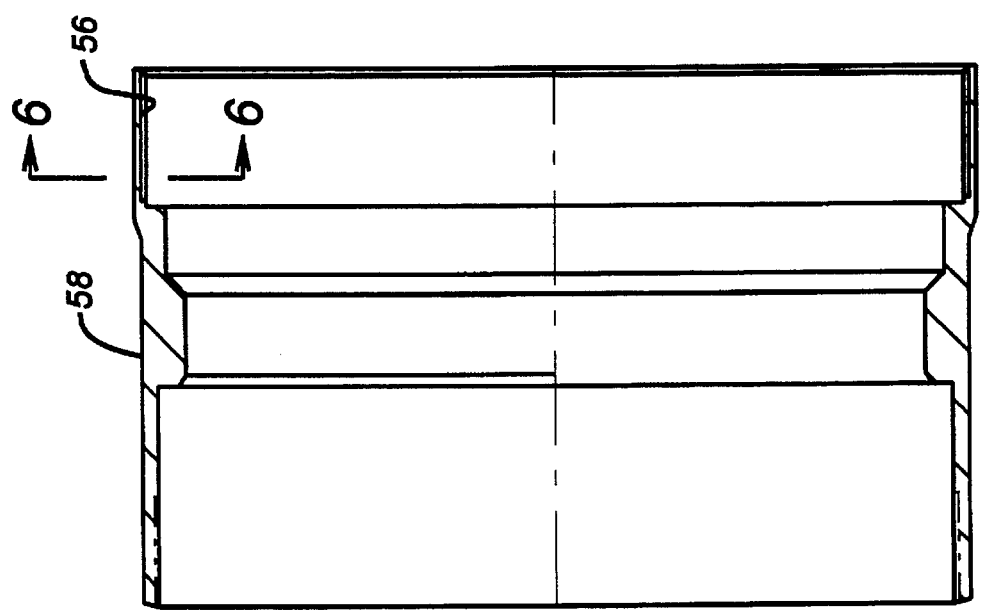

SCREEN AND METHOD OF MANUFACTURING

FIELD OF THE INVENTION

The field of this invention relates to screens, particularly screens used in downhole sand control applications and methods of manufacturing such screens.

BACKGROUND OF THE INVENTION

In the past, there has been a need to control sand or other solids produced from the formation with the flowing oil or other hydrocarbons. Techniques for sand control have involved the use of screens. Various configurations have been attempted for sand-control screens. These screens have generally involved a rigid base pipe which is perforated, overlaid by one or more layers of screen of different opening sizes. Generally, the finest screen, which is the one that is designed for catching the sand or other solid material, is a screen most prone to not only plugging but also other mechanical ailments.

In the past, these fine filtering screens have used very thin wire wrapped around the base pipe and an underlying coarser screen. The filtering screen has generally in the past had a welded longitudinal seam which failed generally due to erosive effects of the flow through the screen or chemical attack on the weldment. Sealing off the ends of the filtering screen to the underlying support structure has also been problematic. Again, due to the fine wire size of the filtering screen, welding the ends to a support body has resulted in failures due to differential expansion creating tensile loads on welds involving fine wire components of the filtering screen. Various mechanical efforts to seal the filtering screen to the underlying structure, such as by use of mechanical bands, has also failed to provide a tight seal, thereby allowing the hydrocarbons to short circuit around the filtering screen, carrying the undesirable sand with them.

In the past, underlying coarse screens below the sand-filtering screen have been made with a wound wire having a triangular cross-section, with a flat side oriented outwardly. This has resulted in coarse screens with fairly small open areas and created numerous dead spots behind the filtering screen where the flat side of the triangularly cross-section wound wire of the underlying coarser screen butted up against the openings of the finer sand-filtering screen. As a result, the sand-filtering screen suffered from losses of efficiency due to the numerous dead spots encountered by the outer flat side of the wound coarse screen broadly abutting the sand-filtering screen.

In order to address these problems encountered in prior sand-control screen systems, a method and apparatus have been developed to improve the performance of such screens. One of the objectives of the present invention is to provide a finished assembly that does not suffer from welded attachments to thin members, which had in the past been a weak point in resisting stress, particularly due to tensile loading, flow erosion, as well as chemical attack. Another object of the invention is to create a more efficient sand-control screen assembly by employing a substrate of a coarse screen, having wound wires of a more rounded or arcuate cross-section, to reduce the dead zones in between the filtering screen and the underlying coarse screen. Another object is to provide a simple mechanical technique for assembling the elements of the screen so that it will give efficient and longer lasting service than the prior designs. These and other objectives will be better understood by a review of the detailed description which follows below.

SUMMARY OF THE INVENTION

A sand-filtering screen-making technique and screen are disclosed, which involve an initial assembly of the sand-filtering screen over an underlying coarse screen. The sand-filtering screen has a mechanical, longitudinal overlap-type joint. End caps are fitted over the filtering screen which has already been preassembled to the underlying coarse screen. The assembly is then mechanically forced through a die to compress the end caps onto the assembled filtering screen and underlying coarse screen. That subassembly is then assembled onto a base pipe and secured. An outer shroud can then be secured to the underlying base pipe, overlaying the filtering screen. The ends of the subassembly comprising the filtering screen and the underlying coarse screen are sealed against the support pipe by a packing gland arrangement at both ends.

BRIEF DESCRIPTION OF THE DRAWINGS

FIG. 5 is a detailed view of the end cap shown at either end of FIG. 4.

FIG. 6 is a section view along lines 6—6 of FIG. 5.

DETAILED DESCRIPTION OF THE PREFERRED EMBODIMENT

Figure 1:
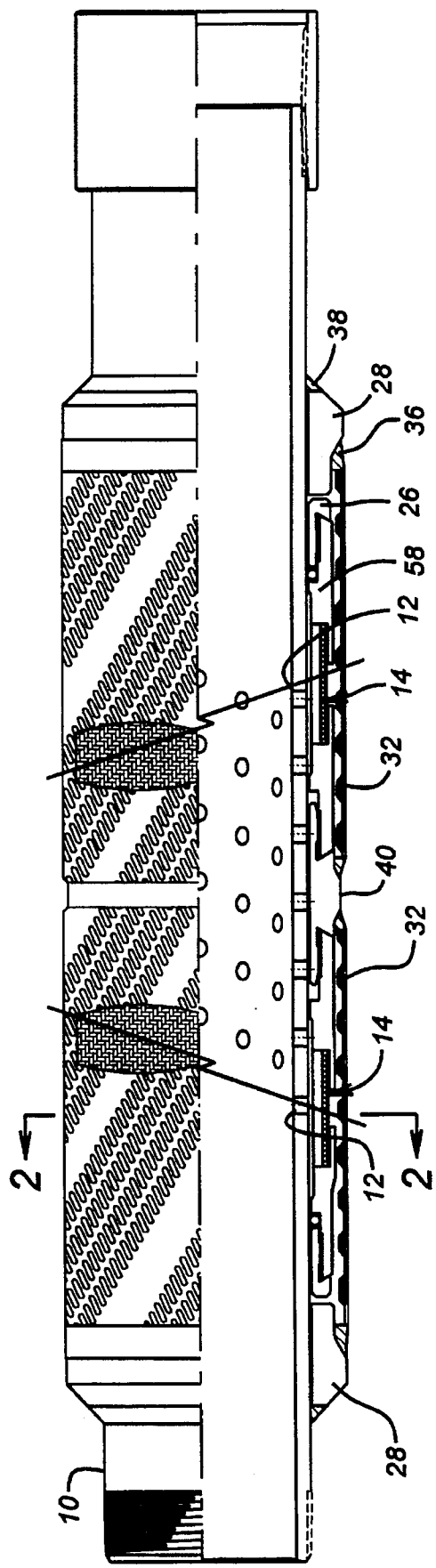
FIG. 1 is a sectional elevational view of the assembled sand-control filter assembly, illustrating optionally connecting two screen sections together.

FIG. 1 illustrates in cross-section an underlying perforated base pipe 10. This pipe has generally fairly large openings which are illustrated as 12. The openings 12 on the base pipe 10 are generally disposed in a helical pattern, as shown in FIG. 1. Overlaying the base pipe 10 is a coarse screen 14, which is better seen in FIG. 8. The coarse screen 14 has a series of longitudinally extending support members 16, which are circumferentially spaced and are tied together by a wound wire 18. The wound wire 18 can be a series of rings or a continuous helix. As best seen in FIG. 10, the cross-sectional shape of the wound wire 18 is preferably arcuate or round, as opposed to the prior art design shown in FIG. 9. On each end of the wound wire 18 is an end cap 20, which secures the fine screen 22 to the wound wire 18. On the other side of the end cap 20 is packing 24, held down by ring 26. The preferred style of the fine screen 22 is an over and under mesh, known generally as DUTCH TWILL, with openings approximately in the area of 80–100 microns. However, the opening size, as well as the wire diameter which is approximately 0.010", can be varied depending upon the specific application and expected loadings.

Figure 8:
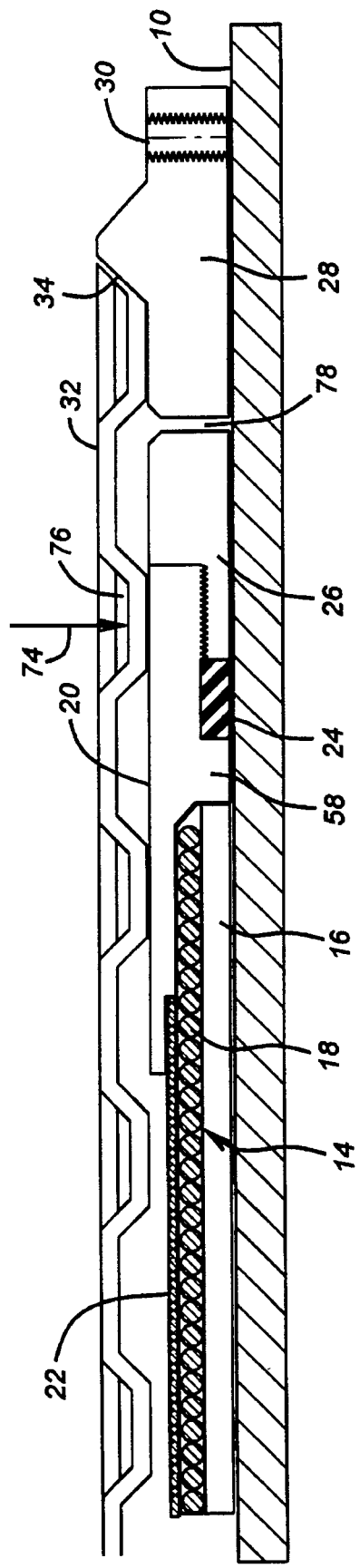
FIG. 8 is a detailed view of the assembled components on the underlying base pipe.

A ring 28 is slipped over the base pipe 10 and secured by a set screw 30. A shroud 32 can be overlaid on ring 30 and held in place by sloping surface 34. The connection between the ring 28 and the shroud 32 at sloping surface 34 can also be welded, as shown in FIG. 1, by a weldment 36. The ring 28 can also be secured to the base pipe 10 by a weldment 38, as shown in FIG. 1. It should be noted that while FIG. 8 shows the assembly at one end, the opposite end is a mirror image. However, segments can be attached together, as shown in FIG. 1, by virtue of the use of a coupling 40. As seen in FIG. 1, coupling 40 connects two identical assemblies, with each shroud 32 secured by welding to the coupling 40 in the middle and on each end to a ring, such as 28. Two or more sections can be joined together, and the length of the filter assembly can be varied to meet the desired size of the pay zone.

Figure 2:
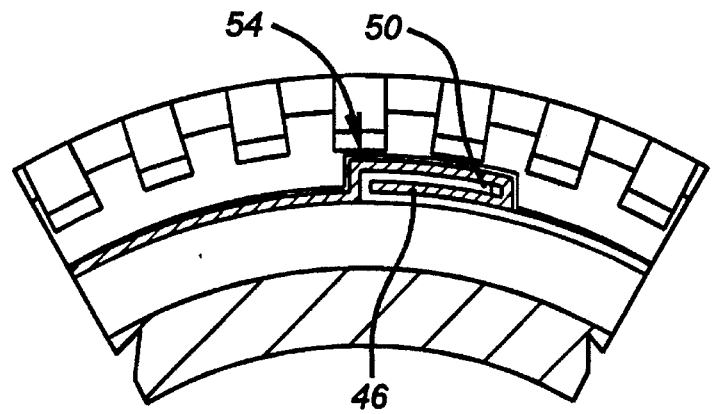
FIG. 2 is a partial section taken along lines 2—2 of FIG. 1.
Figure 3:
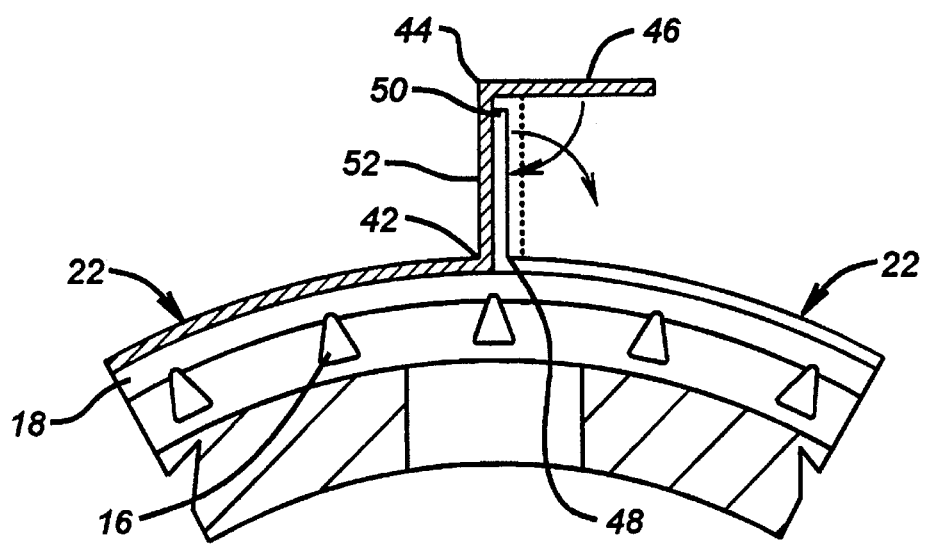
FIG. 3 is the view of FIG. 2 prior to the full assembly of the longitudinal joint on the sand-filtering screen.

The major components of the screen now having been described, the assembly technique will be discussed in more detail. The coarse screen 14 is manufactured into a cylindrical shape. As shown in FIG. 10, the wound wire members 18 are preferably in a rounded cross-sectional configuration. The fine screen 22 comes initially in flat sheets and is cut to size. After cutting the fine screen 22 to size, one end is crimped twice, as shown in FIG. 3. Accordingly, there is a first bend 42 and a second bend 44, leaving a cantilevered tab 46 extending after bend 44. The opposite end of fine screen 22 has a single bend 48 and a cantilevered end 50. When rolled into a cylindrical shape, the cantilevered end 50 abuts a segment 52 disposed between the first bend 42 and the second bend 44. This is illustrated in FIG. 3. The arrows shown in FIG. 3 indicate that the cantilevered end 46 is bent first over the cantilevered end 50. The entire assembly thereafter is bent again, as shown in FIG. 2. Ultimately, the shroud 32 is applied as shown in FIG. 2 but not before certain other assembly procedures take place.

It should be noted that the overlapping and turning of the cantilevered ends, when placed together as shown by comparing FIG. 3 to FIG. 2, results in a tightening of the fine screen 22 over the wound wire 18. The net result is a tight longitudinal seam of overlapping portions of the fine screen 22. The seam, generally indicated as 54 in FIG. 2, ultimately fits within recess 56, as shown in FIG. 6. The end cap 58, shown in FIG. 5, contains a recess 56 which is generally oriented to align with the seam 54. A subassembly is then created involving the coarse screen 14 made up of support members 16 and wound wire 18 in a cylindrical shape, which has now been overlaid with the fine screen 22, with the mechanical longitudinal seam in it bent to the shape as shown in FIG. 2. Having assembled those two components to each other, an end cap 58 is assembled to each end.

Figure 7:
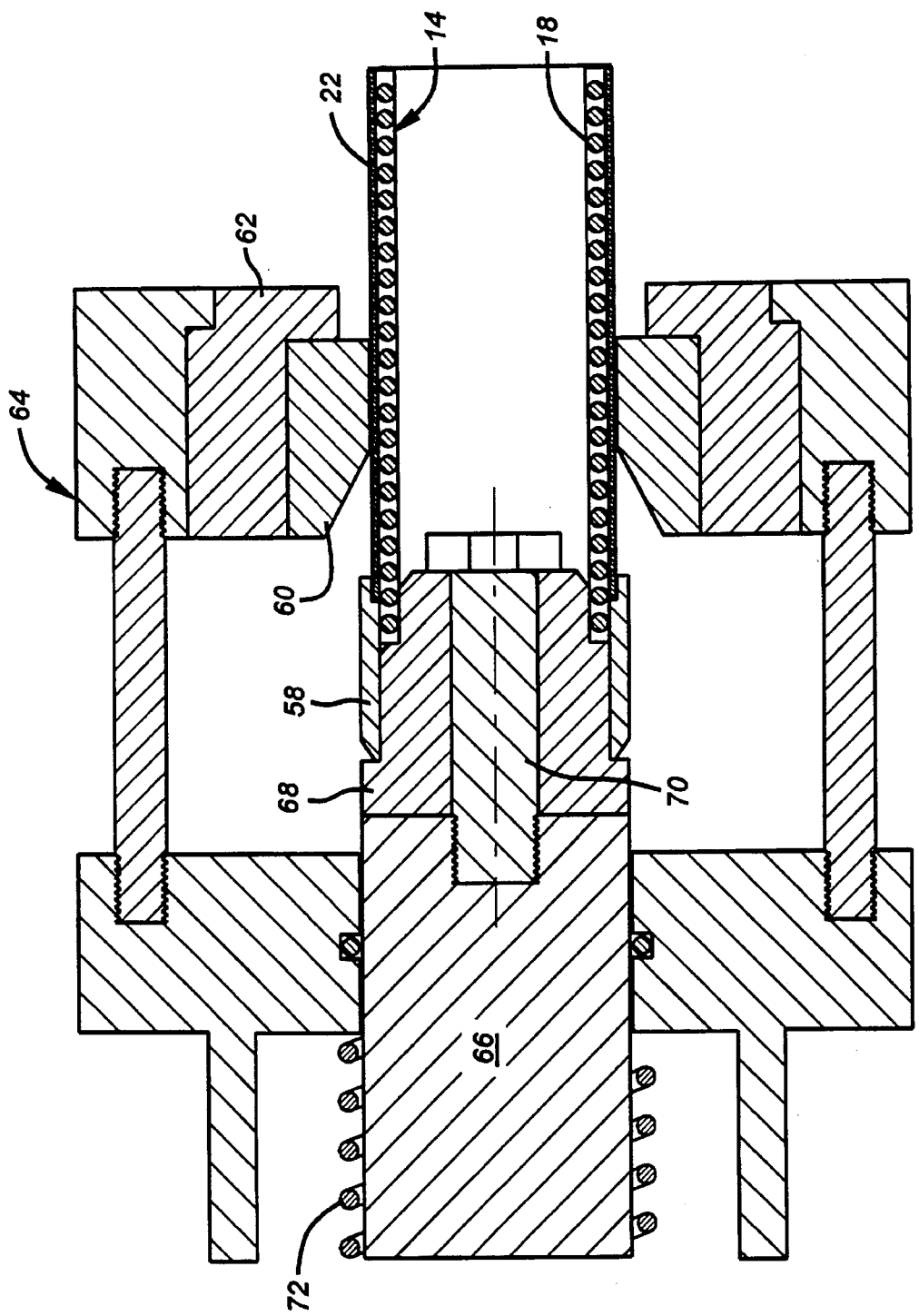
FIG. 7 is a view in schematic form of the technique of forming the subassembly of the underlying coarse screen and the sand-filtering screen.

As previously stated, the overall length of the subassembly can vary, depending upon the application. When the subassembly of the end caps 58 over the fine screen 22 over the coarse screen 14 is fully assembled, with the seam 54 nested within the recess 56, a swage machine such as a machine made by the Mulcanroy Company is used to crimp the end cap 58 to the fine screen 22 which is sandwiched between the coarse screen 14 and the end cap 58. This process is illustrated in FIG. 7. There, a die 60 is retained by a die holder 62, which is in turn held fixed to the frame or bed 64. A ram 66 has a pusher 68 at its leading end. The pusher 68 is retained to the ram 66 by a bolt 70. The ram 66 has a spring return 72. In the position shown, the end cap 58 has already been pushed through the die 60, crimping it onto the fine screen 22, which is sandwiched between the end cap 58 and the coarse screen 14. FIG. 7 again shows the rounded cross-section of the wound wire 18, which is the preferred shape. Preferably, the ram 66 pushes the cap 58 through the die 60 by bearing on it directly. After attaching one end cap in this manner, the other end is capped by repeating the process.

Figure 4:
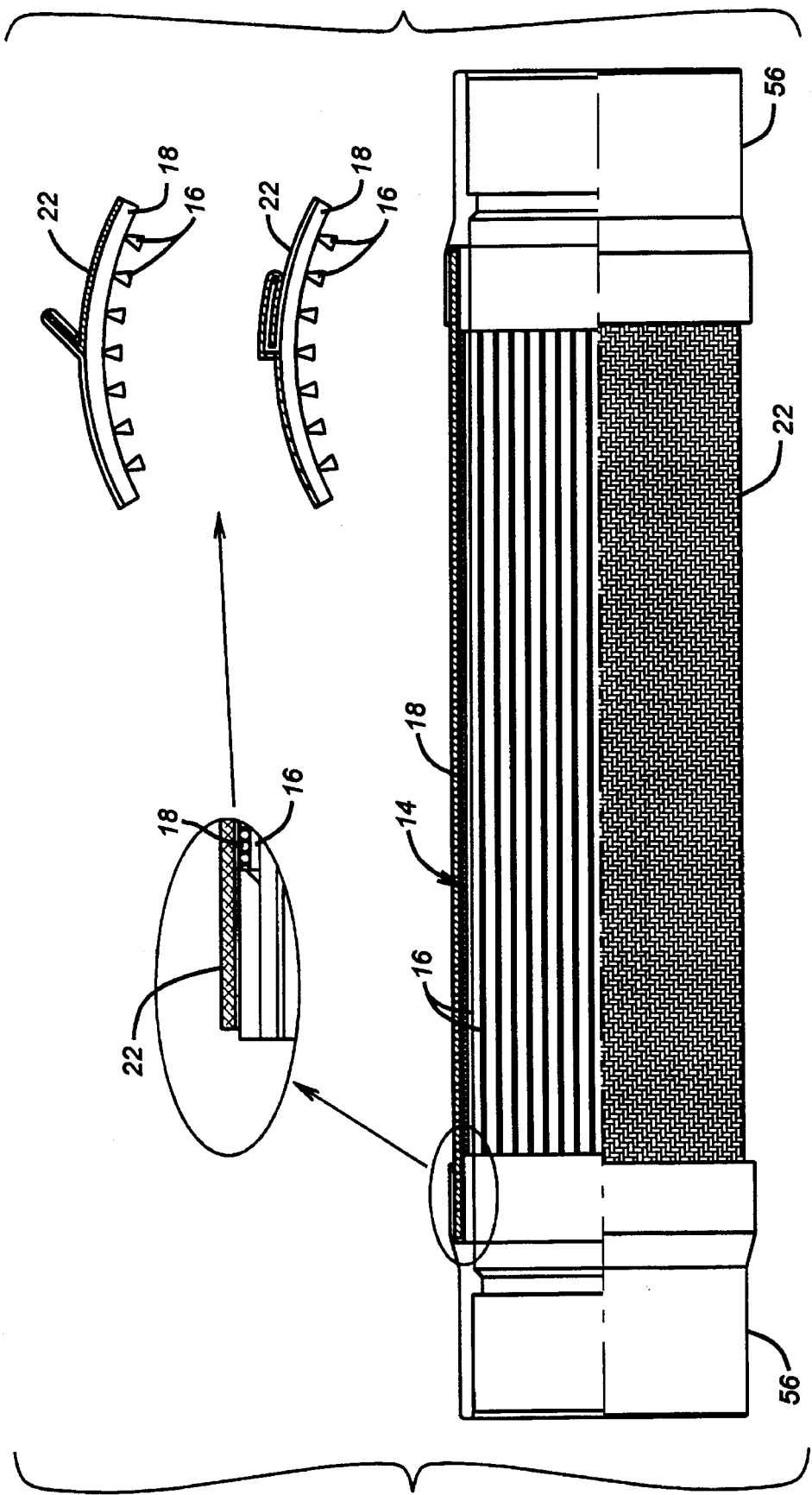
FIG. 4 illustrates a subassembly of the underlying coarse screen, overlaid by the filtering screen with the end caps in place.

As a result of passing the end cap 58 through the die 60, the end cap 58 is pressed uniformly circumferentially inwardly toward the fine screen 22, effectively locking in the ends in a tight joint. The assembly shown in FIG. 7 can then be removed from the machine and the other end cap 58 placed on the subassembly as shown. The subassembly can then be run through the die 60 once again to compress uniformly radially inwardly the end cap 58 over the assembled fine screen 22 backed by coarse screen 14. The subassembly (see FIG. 4) is then complete and can be slipped over the base pipe 10 as shown in FIG. 8. The ring 26, along with packing 24, is then threadedly engaged to the end cap 58. This seals off any leakage path along the base pipe 10.

Having assembled the ring 26, the backup ring 28 is slipped over the base pipe 10 and fixated with set screw 30. As shown in FIG. 1, the ring 28 can also be welded to the pipe 10. An overlaying screen or shroud 32 basically deflects the incoming fluids, requiring such fluids to go downwardly initially, as indicated by arrow 74, and then make a turn to the left or right through an opening 76. This forcing of the incoming fluids to make a sharp transverse bend removes some of the fluid energy in the fluid going through the assembly and minimizes the erosion effects from high velocities, as well as the erosive effects of fluids moving quickly and carrying solid particles. The outer shroud 32 can be loosely fitted, as shown in FIG. 8, where the sloping surface 34 retains it or it can be welded, as shown in FIG. 1. It should be noted that welding the shroud 32 to the ring 28 or the ring 28 to the base pipe 10 does not create the kinds of problems experienced in past designs where the welding involved the fine screen, such as 22. Generally, the fine screen 22 is made of very thin-gauge wires which in the past had presented quality-control problems in trying to make welds onto such fine members without leakage.

Additionally, with the technique as described, there is no longitudinal welded seam but rather a mechanical joint has replaced it. The end seals around the fine screen 22 also indicate a mechanical joint, replacing a welding technique used in prior designs. The subassembly is packed off against a base pipe 10 to prevent channeling around the fine screen 22, thus differential expansion between the base pipe 10 and the subassembly up to the end caps 58 is no longer a concern because there is room for relative movement due to the presence of a gap, such as 78 (see FIG. 8). This gap exists between ring 28 and the pack-off assembly comprising of the end cap 58 and ring 26 sandwiching the packing 24 against the base pipe 10.

Figure 9:
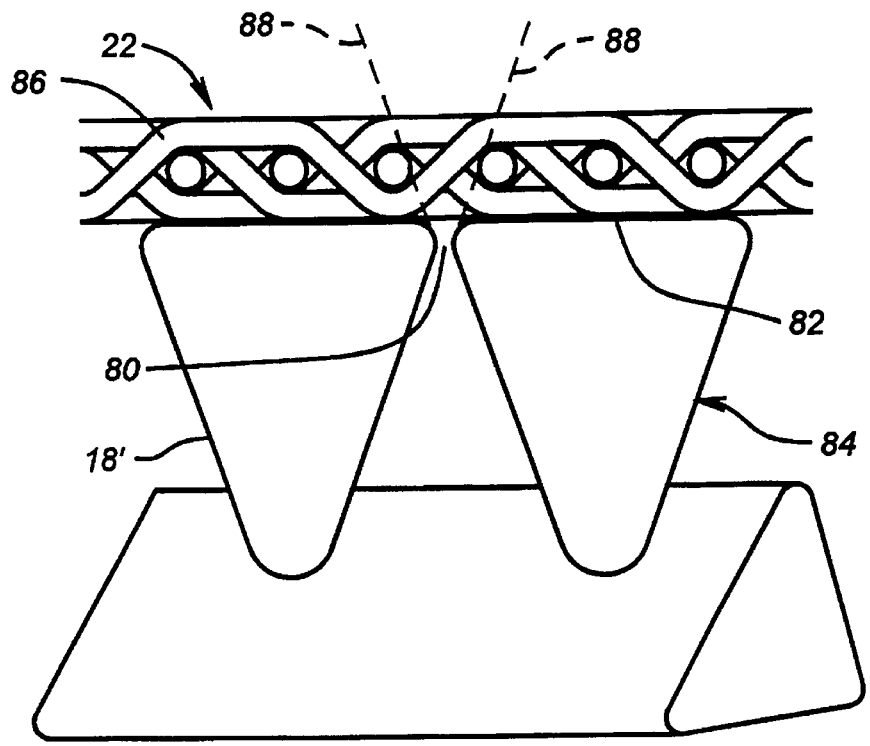
FIG. 9 is a sectional elevational view showing a coarse screen with wound wires having a triangular cross-section as used in the prior art, overlaid with the fine screen of the present invention.
Figure 10:
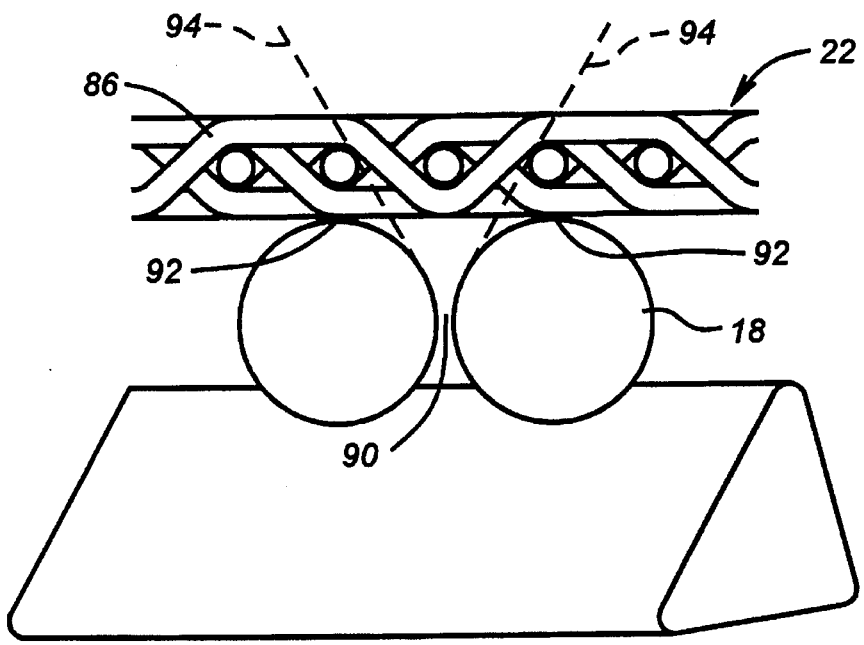
FIG. 10 illustrates the rounded wound wires of the coarse screen overlaid by the fine screen of the present invention.

FIGS. 9 and 10 illustrate a further enhancement of the assembled screen of the present invention. In prior designs, the wound wire 18' had a triangular cross-section. When overlaid with any type of a mesh screen or the preferred screen of the present invention, which is an over and under DUTCH TWILL type thin-wire component screen, with preferred openings in the range of 80–100 microns, the net result was a very small net open area, as can be seen by the relatively small size of the gap 80 compared to the width 82 of one of the triangular segments 84. Thus, many of the fine wires 86 of the fine screen 22 would lay parallel to the edge 82, with edge 82 essentially blanking off a large portion of fine screen 22. In effect, there would be a blockage of flow where the wire segments 86 of the fine screen 22 laid parallel, leaving only small effective filtering area available for the fine screen 22 in the immediate vicinity of the opening 80 and fanning out in a generally conical manner from the opening 80, as illustrated by dashed lines 88. This is to be contrasted with the layout shown in FIG. 10, where the wound wire 18 has a gap 90, which in the preferred embodiment has openings in the order of approximately 120 microns. Stacked above that is the fine screen 22, which has slightly smaller openings of approximately 110 microns in the preferred embodiment. The close relation between the coarse and fine screens within about 10% allows the assembly to continue to be effective, even if the fine screen 22 gets a small tear because the underlying coarse screen has only slightly bigger openings. Significantly, there is only point or line contact at such points 92 between the fine screen 22 and the wound wire 18. With this arrangement, rather than the small defined cone of effective screen area for screen 22, as delineated by dashed lines 88 in FIG. 9, more effective use of the screen 22 can be employed because the dead areas have been eliminated. Dashed lines 94 illustrate this principle. Thus, more effective use is made of the fine screen 22, allowing it to retain useful service life considerably longer than prior fine screens backed up by wound screens such as that illustrated in FIG. 9. By using the Dutch Twill type over and under mesh as the fine screen 22, the combination provides for the creation of a uniform filter cake, prolonging the useful filtering life of the assembly. Since the opening size in the fine screen 22 is only somewhat smaller than the coarse screen 14 below, even if a tear or rip or an isolated pluggage occurs on the screen 22, effective filtration can still occur. The use of the rounded cross-section for the wound wire 18 and its impact on improving the available area of filtering for the outer fine screen 22 allows a smaller spread between opening sizes for the screen 22 as compared to the coarse screen 14 with its wound wire members 18. Therefore, in this manner, the useful service life of the assembly is again extended, even if an occasional isolated tear or rip occurs in the fine screen 22.

Those skilled in the art will appreciate that the assembly technique is simple and easy to use and allows for manufacturing of screens to a desired diameter and length. The longitudinal seam 54, when crimped as shown in FIGS. 2 and 3, helps to compress the fine screen 22 over the coarse screen 14. The end caps 58, with their recesses 56, hold the ends of the longitudinal seam 54. Thereafter, after passage through the die, the end cap 58 is mechanically sealed in an efficient and reliable manner to the assembled fine screen 22 over coarse screen 14. Thus, the problems of past designs involving leakage, chemical attack, and erosive effects, have been essentially eliminated. Welding on thin members is no longer necessary. Mechanical joints that are reliable have replaced the former techniques of welding or mechanical bands, which have proven to be unreliable over a long period. The ease of manufacturing this particular screen lends itself to fabrication, not only in a shop but also at remote field locations with minimal equipment.

While a certain type of overlapping seam has been shown, other types of mechanical interlocks to create a longitudinal seam can be used without departing from the spirit of the invention. The important feature is that the seam gets inset into the end cap so that the seam ends are held securely when the end caps are uniformly squeezed by forcing them through the die.

The foregoing disclosure and description of the invention are illustrative and explanatory thereof, and various changes in the size, shape and materials, as well as in the details of the illustrated construction, may be made without departing from the spirit of the invention.

We claim:

1. A screen assembly for downhole use, comprising:

a coarse screen;

a fine screen overlying said coarse screen;
  said fine screen comprises a longitudinal joint, said joint sealed without using welding techniques; and at least one end cap sealingly secured over said fine screen without the use of welding techniques.

2. The assembly of claim 1, wherein said end cap is secured over said fine screen by deformation resulting from an applied force.

3. The assembly of claim 2, wherein said end cap straddles said joint prior to deformation.

4. The assembly of claim 3, wherein said end cap is forced through a die while mounted over said fine and coarse screens to secure a sealing connection to said fine screen.

5. The assembly of claim 4, further comprising:

a perforated base;

said assembly of said coarse and fine screen with said end cap assembled to said base; and a seal between said base and said end cap retained by said end cap.

6. The assembly of claim 5, further comprising:

at least one fixation ring mounted to said base; and an outer perforated shroud supported by said ring, said shroud forcing fluid passing therethrough to change direction substantially through about 90° to dissipate at least some of the flowing energy of such fluid prior to contacting said fine screen.

7. The assembly of claim 1, wherein said joint is formed by bending one end of said fine screen over a tab formed by an opposite end, to form said fine screen into a tubular shape over said coarse screen.

8. The assembly of claim 7, wherein said bending to form said joint pulls said tubularly shaped fine screen tighter over said coarse screen.

9. The assembly of claim 1, wherein said coarse screen has a tubular shape and comprises a winding of a wire having a rounded cross-section with a plurality of longitudinal rib members for support of said tubular shape.

10. The assembly of claim 9, wherein:

said fine screen comprises an over and under mesh;

said mesh making at most line contact with said rounded cross-section of said winding to minimize blockage of openings in said mesh by said coarse screen.

11. A method of making a screen for downhole use, comprising:

mounting a fine screen over a coarse screen;

forming a nonwelded longitudinal joint in said fine screen;

securing at least one end cap to the assembled coarse and fine screens.

12. The method of claim 11, further comprising:

forcing said end cap into sealing contact with said fine screen by an applied mechanical force.

13. The method of claim 12, further comprising:

forcing said end cap through a die to compress it onto said fine screen.

14. The method of claim 13, further comprising:

forming said joint by folding ends of said fine screen over each other.

15. The method of claim 14, further comprising:
retaining said formed joint with said end cap.

16. The method of claim 15, further comprising:
using a winding of wire having a rounded cross-section as said coarse screen.

17. The method of claim 16, further comprising:
mounting the assembly of said fine and coarse screen over a tubular base;
sealing between said base and said end cap;
allowing said assembly to expand differentially with respect to said base without applied stress to said assembly.

18. The method of claim 16, further comprising:
using an over and under mesh as said fine screen;
mounting the assembly of said fine and coarse screen to a base;
mounting an outer jacket over said fine screen;
forcing fluid flowing through said fine screen to turn substantially transversely to dissipate its flowing energy.

19. The method of claim 18, further comprising:
pulling said fine screen tighter over said coarse screen as a result of folding over said edges to make said joint.

20. The assembly of claim 9, further comprising:
said fine screen having openings slightly smaller than said coarse screen.

21. The method of claim 16, further comprising:
using an opening size on said fine screen slightly smaller than said coarse screen.

22. A screen assembly for downhole use, comprising;
a coarse screen;
a fine screen overlying said coarse screen;
at least one end cap sealingly secured over said fine screen without the use of welding techniques; and
said end cap is secured over said fine screen by deformation resulting from an applied force.

23. The assembly of claim 22, wherein said end cap straddles said fine and coarse screens prior to deformation.

24. The assembly of claim 23, wherein said end cap is forced through a die while mounted over said fine and coarse screens to secure a sealing connection to said fine screen.

25. The assembly of claim 24, further comprising:
a perforated base;
said assembly of said coarse and fine screen with said end cap assembled to said base; and
a seal between said base and said end cap retained by said end cap.

26. The assembly of claim 25, further comprising:
at least one fixation ring mounted to said base; and
an outer performed shroud supported by said ring, said shroud forcing fluid passing therethrough to change direction substantially through about 90° to dissipate at least some of the flowing energy of such fluid prior to contacting said fine screen.

27. The assembly of claim 22, wherein said coarse screen has a tubular shape and comprises a winding of a wire having a rounded cross-section with a plurality of longitudinal rib members for support of said tubular shape.

28. The assembly of claim 27, wherein:
said fine screen comprises an over and under mesh;
said mesh making at most line contact with said rounded cross-section of said winding to minimize blockage of openings in said mesh by said coarse screen.

* * * * *